(12) United States Patent
Ohashi

(10) Patent No.: US 9,639,989 B2
(45) Date of Patent: May 2, 2017

(54) VIDEO PROCESSING DEVICE, VIDEO PROCESSING METHOD, AND VIDEO PROCESSING SYSTEM

(71) Applicant: SONY COMPUTER ENTERTAINMENT INC., Tokyo (JP)

(72) Inventor: Yoshinori Ohashi, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 14/406,919

(22) PCT Filed: Apr. 17, 2013

(86) PCT No.: PCT/JP2013/002605
§ 371 (c)(1),
(2) Date: Dec. 10, 2014

(87) PCT Pub. No.: WO2014/002346
PCT Pub. Date: Jan. 3, 2014

(65) Prior Publication Data
US 2015/0170419 A1   Jun. 18, 2015

(30) Foreign Application Priority Data

Jun. 29, 2012   (JP) .................................. 2012-147344

(51) Int. Cl.
G06T 19/00   (2011.01)
G09G 5/00   (2006.01)
(Continued)

(52) U.S. Cl.
CPC .......... *G06T 19/006* (2013.01); *A63F 13/213* (2014.09); *G02B 27/017* (2013.01);
(Continued)

(58) Field of Classification Search
None
See application file for complete search history.

(56) References Cited

U.S. PATENT DOCUMENTS 6,771,841 B1 * 8/2004 O'Rourke ............... G06T 17/00
345/420
2002/0084974 A1   7/2002 Ohshima et al.
(Continued)

FOREIGN PATENT DOCUMENTS

CN   1161087   10/1997
CN   2667920   1/2005
(Continued)

OTHER PUBLICATIONS

Tedjokusumo, Jefry, Steven ZhiYing Zhou, and Stefan Winkler. "Immersive multiplayer games with tangible and physical interaction." Systems, Man and Cybernetics, Part A: Systems and Humans, IEEE Transactions on 40.1 (2010): 147-157.*
(Continued)

*Primary Examiner* — Ryan M Gray
(74) *Attorney, Agent, or Firm* — Katten Muchin Rosenman LLP

(57) ABSTRACT

An AR image generator 526 employs, as a marker, a subject imaged by an imaging element that images the subject existing in a region including the field of view of a user who wears an optically transmissive HMD and is provided for the optically transmissive HMD, and generates an AR image to be presented by the optically transmissive HMD. A proximity acquirer 560 acquires the distance in a virtual three-dimensional space between a first AR image associated with a first marker and a second marker or a second AR image associated with the second marker. An interaction producer 570 calculates an interaction caused with the first AR image or the second AR image based on the distance acquired by the proximity acquirer 560. The AR image generator 526
(Continued)

changes at least either one image of the first AR image or the second AR image according to the interaction calculated by the interaction producer 570.

12 Claims, 8 Drawing Sheets

(51) Int. Cl.
| | |
|---|---|
| *G09G 5/36* | (2006.01) |
| *H04N 13/04* | (2006.01) |
| *G06F 3/01* | (2006.01) |
| *G02B 27/01* | (2006.01) |
| *G06F 3/03* | (2006.01) |
| *A63F 13/213* | (2014.01) |
| *H04N 5/74* | (2006.01) |

(52) U.S. Cl.
CPC ............ *G06F 3/011* (2013.01); *G06F 3/0304* (2013.01); *G09G 5/00* (2013.01); *G09G 5/36* (2013.01); *H04N 13/04* (2013.01); *G02B 2027/0178* (2013.01); *H04N 5/7491* (2013.01)

(56) References Cited

U.S. PATENT DOCUMENTS

| | | |
|---|---|---|
| 2003/0032484 A1 | 2/2003 | Ohshima et al. |
| 2003/0062675 A1 | 4/2003 | Noro et al. |
| 2006/0256110 A1 | 11/2006 | Okuno et al. |
| 2008/0024597 A1 | 1/2008 | Yang et al. |
| 2008/0100620 A1 | 5/2008 | Nagai et al. |
| 2012/0077582 A1 | 3/2012 | Noge |

FOREIGN PATENT DOCUMENTS

| | | |
|---|---|---|
| CN | 1741620 | 3/2006 |
| EP | 0 899 690 | 3/1999 |
| EP | 0 899 690 A2 | 3/1999 |
| EP | 0 899 690 A3 | 4/2000 |
| EP | 1 060 772 A2 | 12/2000 |
| EP | 1 060 772 A3 | 6/2005 |
| JP | 7-230559 A | 8/1995 |
| JP | 11-088913 A | 3/1999 |
| JP | 2000-350865 A | 12/2000 |
| JP | 2000-353248 A | 12/2000 |
| JP | 2003-103052 A | 4/2003 |
| JP | 2006-072668 A | 3/2006 |
| JP | 2006-244046 A | 9/2006 |
| JP | 2006-313549 A | 11/2006 |
| JP | 2006-318094 A | 11/2006 |
| JP | 2010-026818 A | 2/2010 |

OTHER PUBLICATIONS

Liarokapis, Fotis, et al. "A pervasive augmented reality serious game." Games and Virtual Worlds for Serious Applications, 2009. VS-Games'09. Conference in. IEEE, 2009.*
Chang, Jung-Woo, Wenping Wang, and Myung-Soo Kim. "Efficient collision detection using a dual OBB-sphere bounding volume hierarchy." Computer-Aided Design 42.1 (2010): 50-57.*
International Preliminary Report on Patentability and Written Opinion of the International Searching Authority dated Jan. 8, 2015 from corresponding Application No. PCT/JP2013/002605.
International Search Report dated May 21, 2013, from the corresponding PCT/JP2013/002605.
European search report dated Jan. 5, 2016 from corresponding Application No. 13810089.6.
C. Yuan, Visual Tracking for Seamless 3D Interactions in Augmented Reality, Advances in Visual Computing Lecture Notes in Computer Science;; LNCS, Springer, Berlin, DE, pp. 321-328, XP019025309, ISBN: 978-3-540-30750-1.
Chinese First Office Action dated May 4, 2016 from corresponding Application No. 201380032960.X.
Japanese Office Action dated Dec. 20, 2016 for the Corresponding Japanese Patent Application No. 2016-031175.
Decision of Refusal dated Feb. 28, 2017, from the corresponding Japanese Patent Application No. 2016-031175.

* cited by examiner

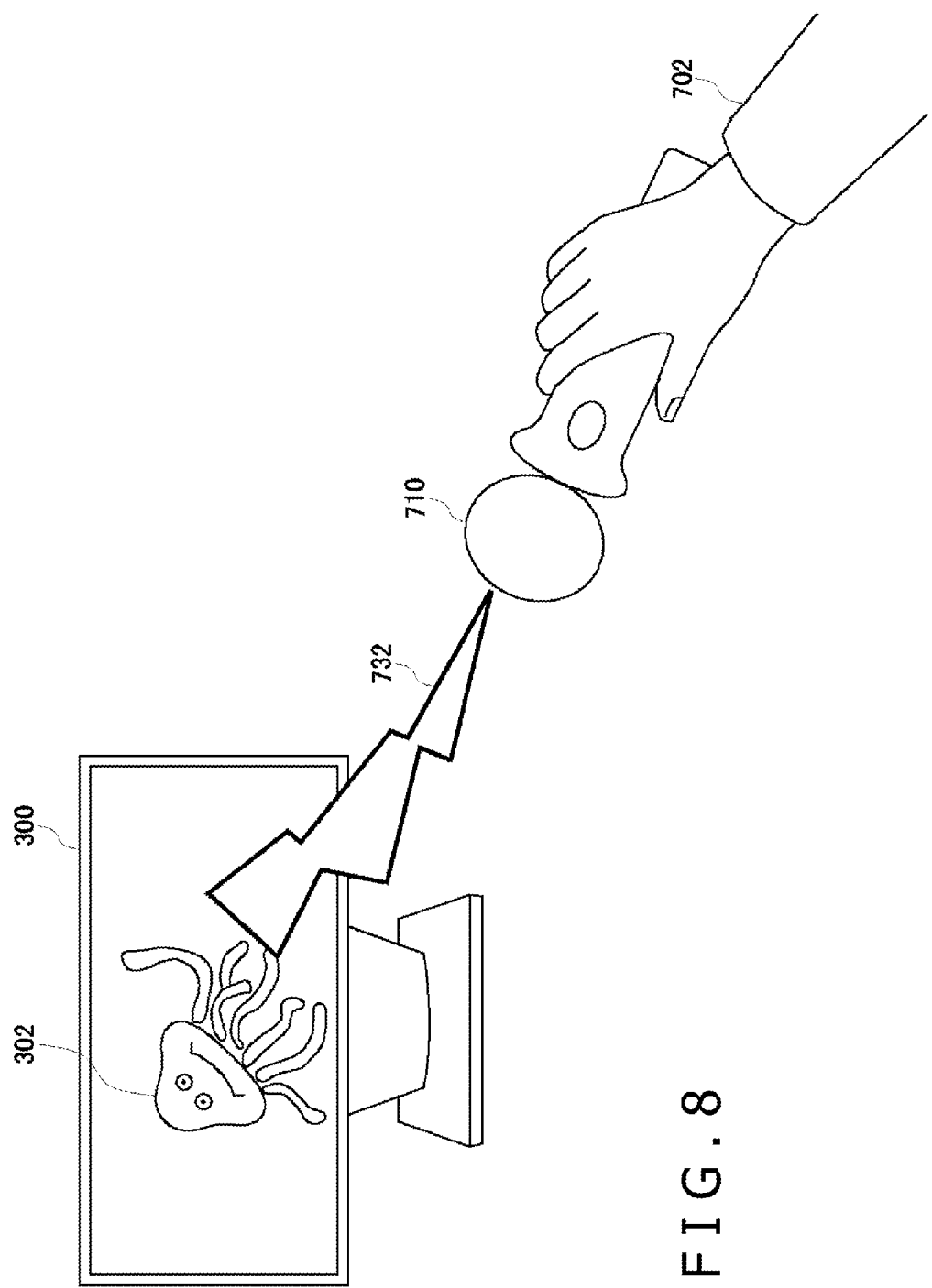

VIDEO PROCESSING DEVICE, VIDEO PROCESSING METHOD, AND VIDEO PROCESSING SYSTEM

TECHNICAL FIELD

The present invention relates to a video processing device, a video processing method, and a video processing system.

BACKGROUND ART

In recent years, technology development for presenting stereoscopic video has been advanced and a head-mounted display (Head Mounted Display; hereinafter, described as "HMD") capable of presenting stereoscopic video having depth is becoming widespread. Among such HMDs, an optically transmissive HMD is also being developed that presents stereoscopic video to a user by using a holographic element, a half mirror, and so forth and allows the user to view the appearance outside the HMD in a see-through manner.

Meanwhile, the AR (Augmented Reality) technique, in which video obtained by adding video of CG (Computer Graphics) or the like to video of the real world arising from imaging by an imaging element such as a camera is generated and modification is added to part of the video of the real world presented to a user, is also entering the phase of practical use. In the AR technique, identifiable specific information such as a bar code is recognized and an image is so generated as to be associated with the information in some cases.

SUMMARY

Technical Problem

In the case of generating an image in association with a specific object, when the position or direction of the object changes, the image associated with the object is generated according to the change. As a result, possibly two different images generated in association with objects different from each other approach each other and even get contact with each other depending on the case. The inventor of the present application has reached recognition of the possibility of providing interactive stereoscopic video by expressing changes caused in the images due to the approach or contact.

The present invention is made in view of such a problem and an object thereof is to provide a technique for producing an interaction between images generated in association with specific objects.

Solution to Problem

To solve the above-described problem, a certain aspect of the present invention is a video processing device. This device includes an AR image generator that employs, as a marker, a subject imaged by an imaging element provided for an optically transmissive HMD and generates an AR image to be presented by the optically transmissive HMD. The optically transmissive HMD presents video observed when a three-dimensional image in a virtual three-dimensional space is projected into a real space. The imaging element images the subject existing in a region including the field of view of a user who wears the optically transmissive HMD. The device further includes a proximity acquirer that acquires the proximity in the virtual three-dimensional space between a first AR image associated with a first marker and a second marker or a second AR image associated with the second marker, and an interaction producer that calculates an interaction caused with the first AR image or the second AR image based on the proximity acquired by the proximity acquirer. Here, the AR image generator changes at least either one image of the first AR image or the second AR image according to the interaction calculated by the interaction producer.

Another aspect of the present invention is a video processing method. This method causes a processor to carry out a step of generating an AR image that is to be presented by a stereoscopic video observation device including an optically transmissive HMD and an imaging element and employs a subject imaged by the imaging element as a marker. The optically transmissive HMD presents video observed when a three-dimensional image in a virtual three-dimensional space is projected into a real space. The imaging element images the subject existing in a region including the field of view of a user who wears the optically transmissive HMD. The method further causes a processor to carry out a step of acquiring the proximity in the virtual three-dimensional space between a first AR image associated with a first marker and a second marker or a second AR image associated with the second marker, a step of calculating an interaction caused with the first AR image or the second AR image based on the acquired proximity, and a step of changing at least either one image of the first AR image or the second AR image according to the calculated interaction.

Further another aspect of the present invention is a video processing system. This system includes an optically transmissive HMD that presents video observed when a three-dimensional image in a virtual three-dimensional space is projected into a real space, and an imaging element that is provided for the optically transmissive HMD and images a subject existing in a region including the field of view of a user who wears the optically transmissive HMD. The system further includes an AR image generator that employs the subject imaged by the imaging element as a marker and generates an AR (Augmented Reality) image to be presented by the optically transmissive HMD, a proximity acquirer that acquires the proximity in the virtual three-dimensional space between a first AR image associated with a first marker and a second marker or a second AR image associated with the second marker, and an interaction producer that calculates an interaction caused with the first AR image or the second AR image based on the proximity acquired by the proximity acquirer. Here, the AR image generator changes at least either one image of the first AR image or the second AR image according to the interaction calculated by the interaction producer.

Further another aspect of the present invention is a program that causes a computer to implement the respective steps of the above-described method.

This program may be provided as part of firmware incorporated in apparatus in order to carry out basic control of hardware resources such as video and audio decoders. This firmware is stored in e.g. a ROM (Read Only Memory) in the apparatus or a semiconductor memory such as a flash memory. To provide this firmware or update part of the firmware, a computer-readable recording medium in which this program is recorded may be provided and this program may be transmitted by a communication line.

What are obtained by translating arbitrary combinations of the above constituent elements and expressions of the present invention among method, device, system, computer program, data structure, recording medium, and so forth are also effective as aspects of the present invention.

Advantageous Effects of Invention

According to the present invention, a technique for producing an interaction between images generated in association with specific objects can be provided.

BRIEF DESCRIPTION OF DRAWINGS

FIG. 8 is a diagram explaining the proximity between a certain AR image and a marker.

DESCRIPTION OF EMBODIMENTS

The outline of an embodiment of the present invention will be described. In the embodiment of the present invention, when a three-dimensional image moved by operation of a user comes close to another three-dimensional image, based on the proximity thereof, a virtual interaction between the three-dimensional images is produced and reflected in the three-dimensional images. Furthermore, the interaction is e.g. contact, collision, or the like between the three-dimensional images, and the three-dimensional images are changed and presented according to attributes of the three-dimensional images, such as virtual speed and acceleration, before and after the interaction.

Figure 1:
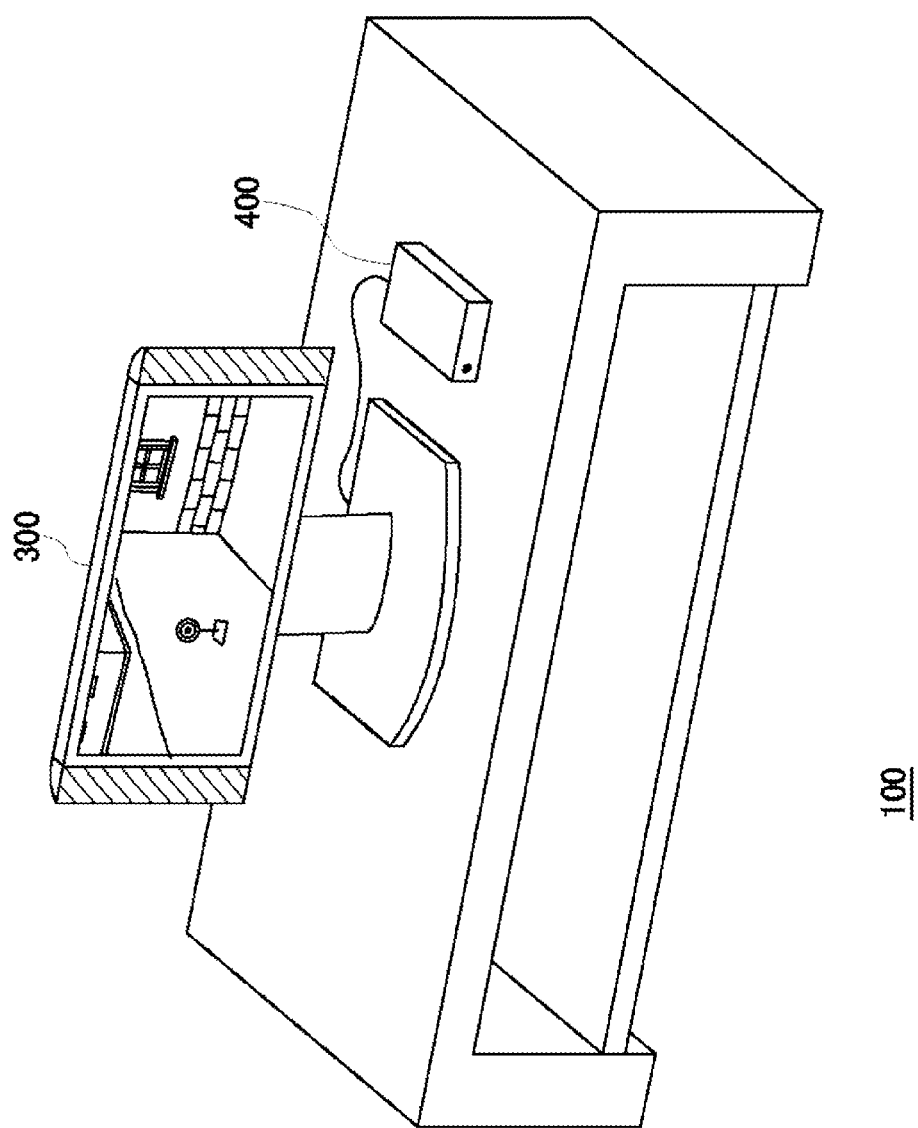
FIG. 1 is a diagram schematically showing the whole configuration of a video presenting system according to an embodiment.
Figure 1:
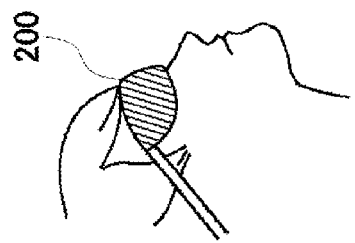

FIG. 1 is a diagram schematically showing the whole configuration of a video presenting system 100 according to the embodiment. The video presenting system 100 according to the embodiment includes a stereoscopic video observation device 200, a three-dimensional monitor 300, and an information processing device 400.

The stereoscopic video observation device 200 is an optically transmissive HMD. Here, the stereoscopic video observation device 200 may include an optical shutter (not shown in the diagram) used to observe the three-dimensional monitor 300 to be described later. The optical shutter opens and closes left and right shutters in synchronization with switching of a disparity image of the three-dimensional monitor 300. Specifically, when the three-dimensional monitor 300 is displaying a disparity image for the left eye, the optical shutter closes the shutter for the right eye and opens the shutter for the left eye to present the disparity image for the left eye to the user who wears the stereoscopic video observation device 200. Conversely, when the three-dimensional monitor 300 is displaying a disparity image for the right eye, the optical shutter closes the shutter for the left eye and opens the shutter for the right eye to present the disparity image for the right eye to the user. The optical shutter can be implemented by using a known liquid crystal shutter for example.

The stereoscopic video observation device 200 receives a synchronization signal for shutter switching. The synchronization signal is wirelessly transmitted from a signal transmitter that is provided in the three-dimensional monitor 300 or the information processing device 400 and is not shown in the diagram by using e.g. infrared light.

The three-dimensional monitor 300 displays stereoscopic video by a frame sequential system. Because the left and right eyes of the human are separate by about 6 cm, disparity is generated between video seen from the left eye and video seen from the right eye. It is said that the human brain utilizes disparity images perceived by the left and right eyes as one piece of information for recognizing depth. Therefore, when the disparity image to be perceived by the left eye and the disparity image to be perceived by the right eye are projected onto the respective eyes, the images are recognized as video having depth by the human. The three-dimensional monitor 300 alternately displays the disparity image for the left eye and the disparity image for the right eye in a time-division manner. The three-dimensional monitor 300 can be implemented by a known presenting device such as a liquid crystal television, a plasma display, or an organic EL monitor.

The information processing device 400 acquires stereoscopic video adapted to be presented in the video presenting system 100 and the above-described synchronization signal. Examples of the information processing device 400 are e.g. a stationary game console and a portable game machine. The information processing device 400 generates stereoscopic video and synchronization signals by using a built-in processor or acquires stereoscopic video from another information processing device such as a server via a network interface not shown in the diagram.

Figure 2:
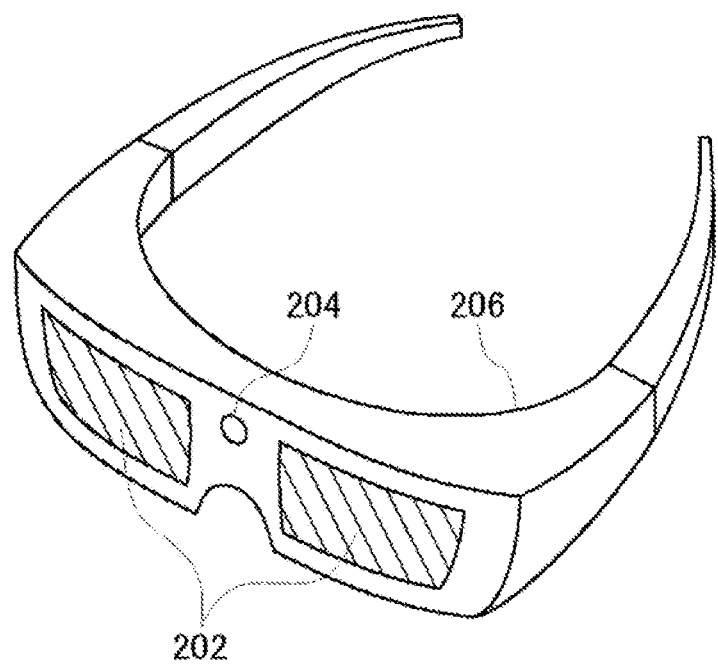
FIG. 2 is a diagram schematically showing one example of the appearance of a stereoscopic video observation device according to the embodiment.

FIG. 2 is a diagram schematically showing one example of the appearance of the stereoscopic video observation device 200 according to the embodiment. The stereoscopic video observation device 200 includes a presenting section 202 that presents stereoscopic video, an imaging element 204, and a casing 206 in which to house various modules.

The presenting section 202 includes an optically transmissive HMD that presents stereoscopic video to user's eyes and a liquid crystal shutter that changes the transmittance of external light transmitted through the optically transmissive HMD. The imaging element 204 images a subject existing in a region including the field of view of the user who wears the stereoscopic video observation device 200. For this purpose, the imaging element 204 is so set as to be disposed around a position between the eyebrows of the user when the user wears the stereoscopic video observation device 200. The imaging element 204 can be implemented by using e.g. a known solid-state imaging element such as a CCD (Charge Coupled Device) image sensor or a CMOS (Complementary Metal Oxide Semiconductor) image sensor.

The casing 206 plays a role of a frame in the stereoscopic video observation device 200 having a glasses shape and houses various modules (not shown in the diagram) used by the stereoscopic video observation device 200. The modules used by the stereoscopic video observation device 200 are an optical engine including a hologram light guide plate configured to implement the optically transmissive HMD, a driver configured to drive the liquid crystal shutter, a synchronization signal receiver, a communication module such as a Wi-Fi (registered trademark) module, an electronic compass, an acceleration sensor, an inclination sensor, a GPS (Global Positioning System) sensor, an illuminance sensor, and so forth. These modules are exemplifications and the stereoscopic video observation device 200 does not necessarily need to incorporate all of these modules. Which module is to be incorporated may be decided depending on the use scene assumed by the stereoscopic video observation device 200.

FIG. 2 is a diagram that exemplifies the stereoscopic video observation device 200 having a glasses shape. Besides, there will be a wide variety of the shapes of the stereoscopic video observation device 200, such as a hat shape, a shape of a belt looped around the head of the user and fixed, and a shape of a helmet covering the whole head of the user. It will be easily understood by those skilled in the art that the stereoscopic video observation device 200 having any shape is also included in the embodiment of the present invention.

Figure 3:
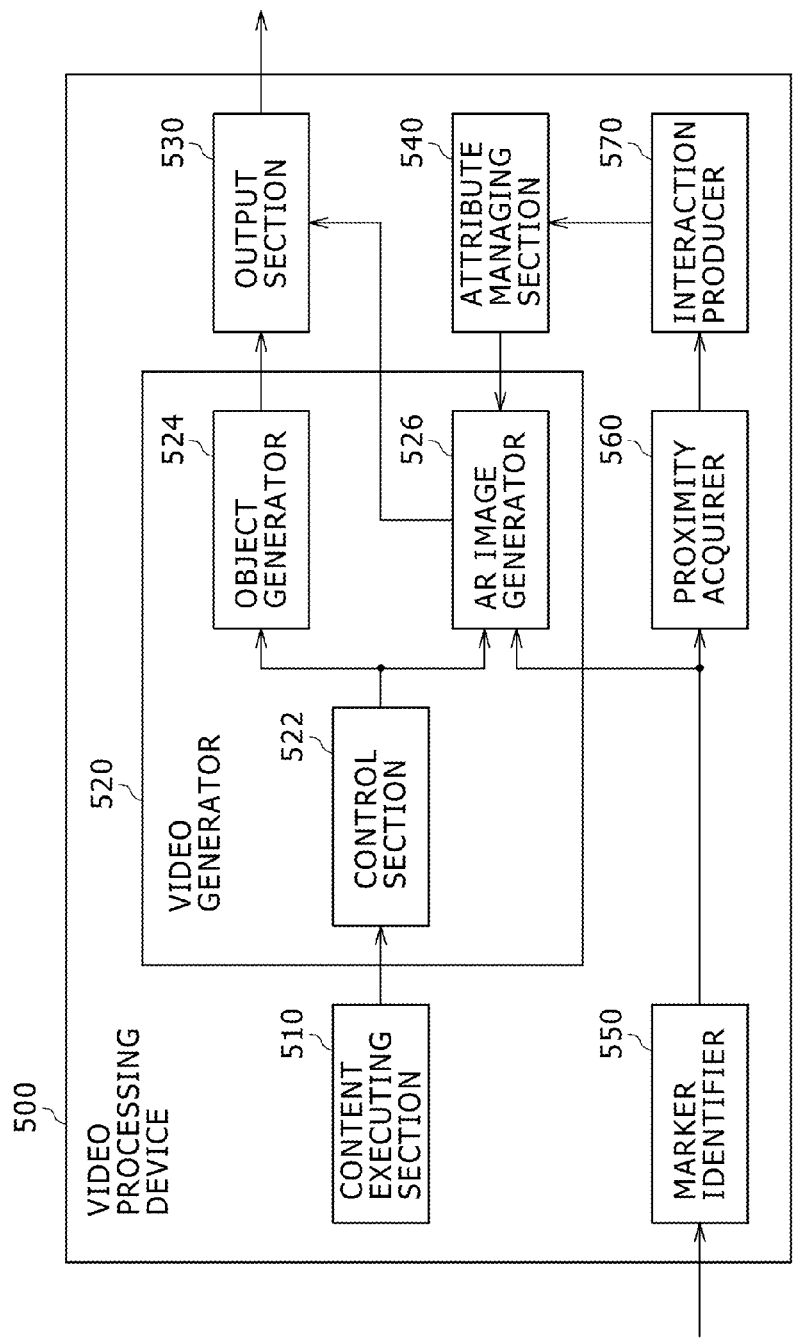
FIG. 3 is a diagram schematically showing the internal configuration of a video output device according to the embodiment.

FIG. 3 is a diagram schematically showing the internal configuration of a video processing device 500 according to the embodiment. The video processing device 500 according to the embodiment is implemented as part of the above-described information processing device 400. Alternatively, it may be implemented in a server that generates stereoscopic video to be transmitted to the information processing device 400 via a network such as the Internet or may be incorporated in the stereoscopic video observation device 200 or the three-dimensional monitor 300. Further alternatively, the video processing device 500 may be one independent device. In the following, description will be made based on the premise that the video processing device 500 according to the embodiment is implemented as part of the above-described information processing device 400.

The video processing device 500 according to the embodiment includes a content executing section 510, a video generator 520, an output section 530, an attribute managing section 540, a marker identifier 550, a proximity acquirer 560, and an interaction producer 570.

The content executing section 510 executes content including video treated as a processing target for the video processing device 500, such as a game application and an application to provide map information. By executing content, the content executing section 510 sets a three-dimensional object to be displayed by the stereoscopic video observation device 200 in a virtual three-dimensional space.

Here, the "object" in the present specification is a collection of polygons serving as elements of drawing in three-dimensional CG, and the respective polygons have common coordinate axes and have a meaning as one cluster. Specifically, it is a polygon aggregation expressing an object such as a tree, house, or car or a polygon aggregation expressing a person or a living thing such as a character as the operation target for a user. Because the collection of polygons forming the "object" has common coordinate axes, it is possible to specify the position and direction in a virtual three-dimensional space.

For example, in the case of expressing a situation in which an object representing a "tree" is cut down from its root, the "tree" standing upright in a virtual three-dimensional space is so drawn as to be gradually inclined in the three-dimensional space with the root being the rotation axis. At this time, each coordinate of the polygons forming the object of the "tree" can be obtained by calculating coordinate transformation of the rotation about the rotation axis. These operations can be implemented by calculation of linear transformation using a known 4×4 transformation matrix, along with scale transformation of enlargement or reduction.

The video generator 520 generates stereoscopic video to be displayed by the stereoscopic video observation device 200 based on the three-dimensional object set in the virtual three-dimensional space by the content executing section 510. Specifically, the video generator 520 generates a disparity image for the left eye and a disparity image for the right eye about the three-dimensional object set in the virtual three-dimensional space by the content executing section 510.

The marker identifier 550 acquires video obtained by continuous imaging by the imaging element 204 provided in the stereoscopic video observation device 200 and identifies a marker in the video. Here, the "marker" is e.g. information used by an object acquirer 502 that generates an object and is information that allows identification of the position of an image generated in the virtual three-dimensional space. Specific examples of the marker are e.g. an image or a moving image displayed on a monitor, an image printed on a card or paper, an object having a specific shape such as a circle or a star, a specific color, the silhouette or face of a person or an animal, and a position indicated by specific position information by the GPS or the like. If e.g. a three-dimensional object like a circular cone is used as the marker, the "direction" of the marker in the three-dimensional space can be identified. In such a case, it is possible to identify not only the position at which an image should be generated but also the direction of the image to be generated.

An AR image is associated with the marker in many cases. Here, the "AR image" is an object associated with a marker and is an object whose position, direction, or inclination changes in conjunction with change in the position, direction, or inclination of the marker. For example, suppose that a bar code printed on paper is treated as a marker and an AR image of a "ball" moving based on a velocity vector $v_1$ is associated with it. In this case, if a user moves the marker based on a velocity vector $v_2$, the "ball" moves with the direction and speed of a resultant vector $v_3$ of the velocity vector $v_1$ and the velocity vector $v_2$ because moving in conjunction with the marker. In this manner, the AR image associated with the marker is also included in the object generated by the video generator 520. For this reason, the video generator 520 includes an object generator 524, an AR image generator 526, and a control section 522.

The control section 522 carries out overall control of the operation of the object generator 524 and the AR image generator 526. The control section 522 acquires information on a three-dimensional object set in a virtual three-dimensional space by the content executing section 510 and the direction of the line of sight for generating video presented to a user, and makes the object generator 524 generate disparity images. Under control by the control section 522, the object generator 524 generates disparity images and outputs them to the output section 530 to be described later.

Figure 4:
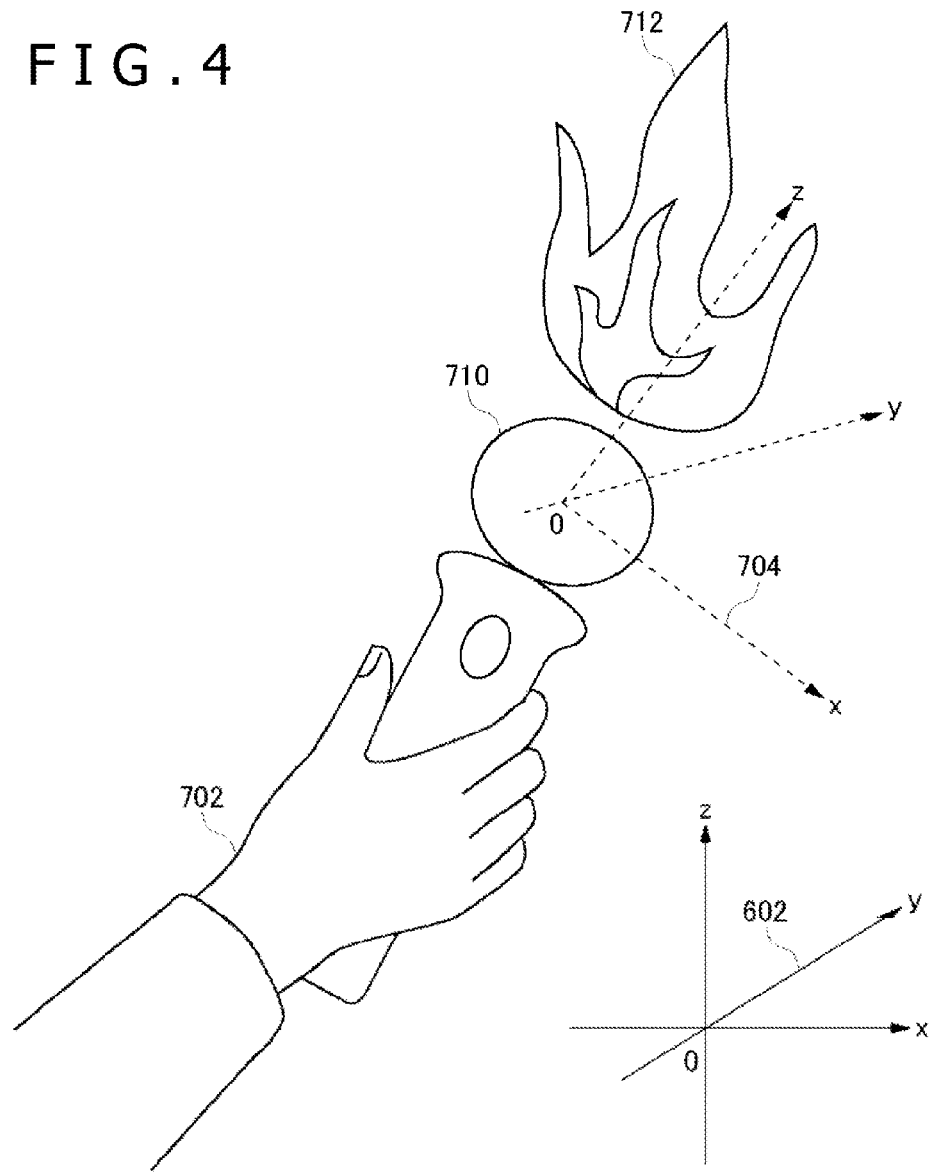
FIG. 4 is a diagram that exemplifies video including a marker and an AR image associated with the marker according to the embodiment.

Under control by the control section 522, the AR image generator 526 generates an AR image associated with a marker identified by the marker identifier 550. FIG. 4 is a diagram that exemplifies video including a marker 710 and an AR image 712 associated with the marker. FIG. 4 exemplifies the marker 710 composed of a bar-shaped grip part grasped by a user's arm 702 and a spherical object. Naturally, the user's arm 702 really exists. Furthermore, the marker 710 is also an object that really exists. As shown in FIG. 4, an orthogonal coordinate system 602 based on x-axis, y-axis, and z-axis is set in the three-dimensional space. The orthogonal coordinate system 602 corresponds with a coordinate system set in a virtual three-dimensional space by the object generator 524 and the AR image generator 526.

It is preferable to set the orthogonal coordinate system 602 in such a manner that the xy plane stretched by the x-axis and the y-axis of the orthogonal coordinate system 602 is parallel to the display area of the three-dimensional monitor 300. Specifically, it is preferable that the origin O of the orthogonal coordinate system 602 is so set that the display area of the three-dimensional monitor 300 overlaps on the xy plane stretched by the x-axis and the y-axis of the orthogonal coordinate system 602. Furthermore, it is preferable that the z-axis of the orthogonal coordinate system 602 is so set that negative z coordinate values are defined on the side of the viewpoint of the user who wears the stereoscopic video observation device 200 relative to the display area of the three-dimensional monitor 300 and positive z coordinate values are defined on the opposite side to the viewpoint across the display area of the three-dimensional monitor 300.

In the example shown in FIG. 4, the AR image 712 is an object expressing a flame. Because the AR image 712 generated by the AR image generator 526 in association with the marker 710 is also an object, position coordinates are defined. The AR image generator 526 generates the AR image 712 in accordance with not the above-described orthogonal coordinate system 602 but a coordinate system 704 that is so set that a point settled according to the position of the marker 710, with which the AR image 712 is associated, is deemed as the origin. Therefore, when the user changes the position, direction, and inclination of the marker 710, the coordinate system 704 employed as the basis for the AR image 712 is also changed. When the coordinate system 704 is changed, the position and direction of the AR image 712 are also changed along with it. The origin of the coordinate system 704 employed as the basis for the AR image 712 does not necessarily need to be located at a position overlapping with the relevant marker.

In this manner, the AR image as an object generated by the AR image generator 526 moves in conjunction with the motion of the marker 710. So, the proximity acquirer 560 calculates and acquires the proximity between two different AR images, i.e. the distance between two AR images.

Figure 5:
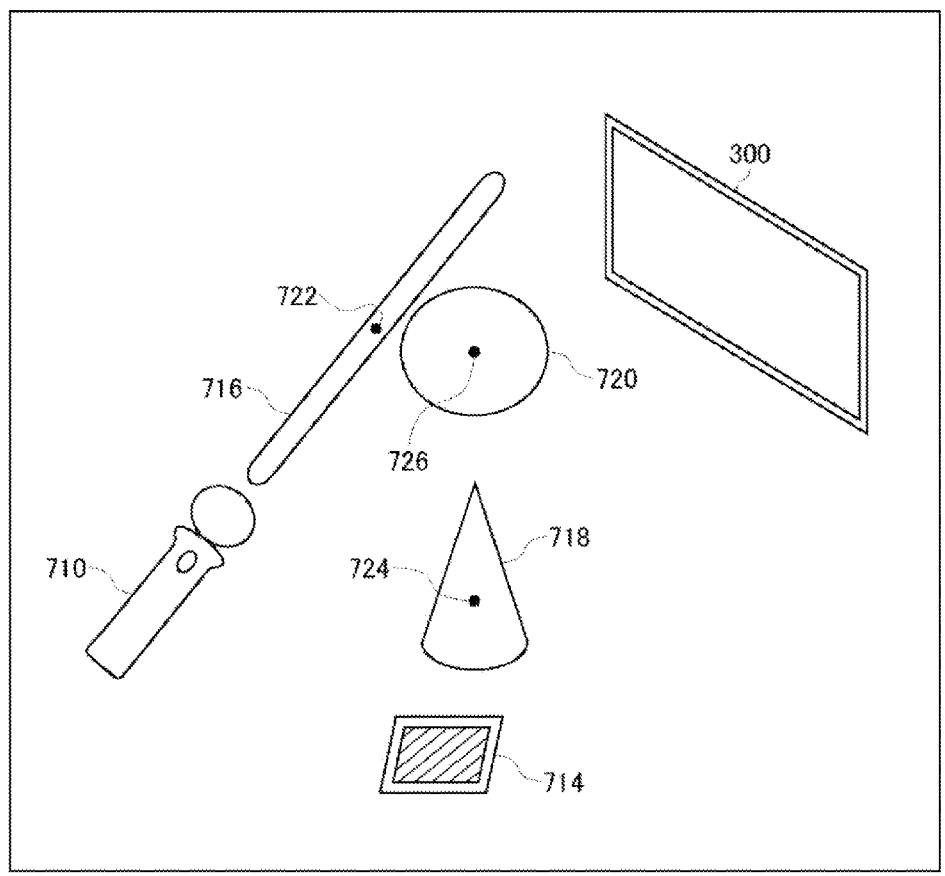
FIG. 5 is a diagram explaining the proximity between two different AR images according to the embodiment.

FIG. 5 is a diagram explaining the proximity between two different AR images and is a diagram showing one example of video presented to a user who wears the stereoscopic video observation device 200. FIG. 5 shows three kinds of markers 710, 714, and 300 and three kinds of AR images 716, 718, and 720 associated with them. Here, the marker 714 is an image printed on paper. As for the marker 300, the display area in the three-dimensional monitor 300 serves as the marker. The AR image 716 associated with the marker 710 is a shining virtual sword blade and the AR image 718 associated with the marker 714 is an object having a circular conical shape. Furthermore, the AR image 720 associated with the marker 300 is a spherical object that comes flying from the three-dimensional monitor 300 and moves in such a direction as to get away from the three-dimensional monitor 300.

For each AR image, a distance measurement reference point defined for measuring the distance between AR images is settled. In the example shown in FIG. 5, the distance measurement reference point of the AR image 716 is indicated by numeral 722. Similarly, the distance measurement reference points of the AR image 718 and the AR image 720 are indicated by numerals 724 and 726, respectively. The distance measurement reference point may be any point as long as it exists on the surface of a polygon forming the AR image 716 or near the AR image 716. As one example, the proximity acquirer 560 sets the distance measurement reference point at the position of the centroid of plural polygons forming the AR image 716. Due to this, even when an object is composed of plural polygons, the position coordinates of the object can be represented by one set of coordinates. Thus, suppression of the calculation cost and enhancement in the processing speed can be expected.

For each AR image, a collision determination criterion radius defined for determining collision between AR images is also settled. For example, suppose that, in the example shown in FIG. 5, the collision determination criterion radius of the AR image 716 is $r_1$ and the collision determination criterion radius of the AR image 720 is $r_2$. Furthermore, suppose that the coordinates of the distance measurement reference point of the AR image 716 are $(x_1, y_1, z_1)$ and the coordinates of the distance measurement reference point of the AR image 720 are $(x_2, y_2, z_2)$. In this case, the proximity acquirer 560 evaluates a value E of an expression shown by the following expression (1).

$$E=(x_1-x_2)^2+(y_1-y_2)^2+(z_1-z_2)^2-(r_1+r_2)^2 \quad (1)$$

If E=0 is satisfied in expression (1), this means that the Euclidean distance L between the distance measurement reference point of the AR image 716 and the distance measurement reference point of the AR image 720 is equal to the sum of the collision determination criterion radius $r_1$ of the AR image 716 and the collision determination criterion radius $r_2$ of the AR image 720. In this case, the proximity acquirer 560 regards the AR image 716 and the AR image 720 as "being in contact with each other." Furthermore, if E<0 is satisfied in expression (1), this means that the sum of the collision determination criterion radius $r_1$ of the AR image 716 and the collision determination criterion radius $r_2$ of the AR image 720 is larger than the Euclidean distance L between the distance measurement reference point of the AR image 716 and the distance measurement reference point of the AR image 720. In this case, the proximity acquirer 560 regards the AR image 716 and the AR image 720 as "being separate from each other." Conversely, if E>0 is satisfied in expression (1), this means that the sum of the collision determination criterion radius $r_1$ of the AR image 716 and the collision determination criterion radius $r_2$ of the AR image 720 is smaller than the Euclidean distance L between the distance measurement reference point of the AR image 716 and the distance measurement reference point of the AR image 720. In this case, the proximity acquirer 560 regards the AR image 716 and the AR image 720 as "overlapping with each other." In this manner, the value of E acquired by the proximity acquirer 560 can be used as a value expressing the proximity between two AR images.

Here, it is enough for the collision determination criterion radius of each AR image to be a value reflecting the size of the AR image in the three-dimensional space. For example, it may be set based on the distance from the distance measurement reference point to the polygon forming the AR image. Specifically, the average of the distances from the distance measurement reference point to the respective polygons forming the AR image, the maximum value or minimum value of the distance, or the like may be employed as the collision determination criterion radius of the AR image.

Returning to the description of FIG. 3, the interaction producer 570 calculates an interaction caused between two different AR images based on the proximity acquired by the proximity acquirer 560. Here, the "interaction" is a concept including virtual physical or chemical interactions caused between AR images and visual effects (VFX) using CG. Examples of the former are the law of conservation of momentum in collision between rigid bodies, a phenomenon that, in the case of collision between soft bodies, both join to each other, and a phenomenon that, when one AR image is burning, a flame is passed to the other AR image that is not burning thus far. Examples of the latter are an effect that, when one AR image is a sword blade that cuts everything, another AR image that gets contact with the AR image is cut and an effect that, when one AR image is given such an attribute as to be transmitted through everything, it overlaps with the other AR image without interference.

The attribute managing section 540 manages attributes including information indicating virtual physical properties and visual effects given to each of AR images generated by the AR image generator 526. Here, the attributes managed by the attribute managing section 540 change according to the interaction calculated by the interaction producer 570. Specifically, the physical properties included in the attributes managed by the attribute managing section 540 include the position coordinates of the AR image in the three-dimensional space, velocity vector, acceleration vector, mass, the rigidity of the AR image, color, temperature, whether or not the AR image is burning, whether or not the AR image is luminous, and the above-described distance measurement reference point and collision criterion radius. These physical properties are exemplifications and the attribute managing section 540 does not necessarily need to manage all of these physical properties. What kinds of physical properties are to be managed may be decided depending on the use scene assumed by content reproduced by the content executing section 510.

The interaction producer 570 changes the physical properties of two AR images based on the proximity acquired by the proximity acquirer 560. Specifically, the interaction producer 570 calculates an interaction based on the proximity acquired by the proximity acquirer 560 and the attribute managing section 540 changes the attributes given to the AR images according to the interaction calculated by the interaction producer 570. The AR image generator 526 changes images generated when the attributes of the AR images change.

For example, a consideration will be made below about a case in which, in the example shown in FIG. 5, the AR image 720, which is a spherical object that comes flying from the three-dimensional monitor 300 and moves in such a direction as to get away from the three-dimensional monitor 300, collides with the AR image 718, which is an object that is still on the three-dimensional space and has a circular conical shape. Suppose that, in this case, the proximity acquirer 560 calculates the proximity between the AR image 720 and the AR image 718 and determines that both are in contact with each other. Based on mass and velocity vector as attributes of the AR image 720 and mass and velocity vector as attributes of the AR image 718, the interaction producer 570 calculates the velocity vectors of both after the collision by applying the law of conservation of momentum and the law of conservation of kinetic energy to the calculation.

The attribute managing section 540 rewrites the velocity vectors in the attributes of the AR image 718 and the AR image 720 by the velocity vectors calculated by the interaction producer 570. The AR image generator 526 changes the AR image 718 and the AR image 720 so that the AR image 718 and the AR image 720 may move in accordance with the velocity vectors rewritten by the attribute managing section 540.

Figure 6:
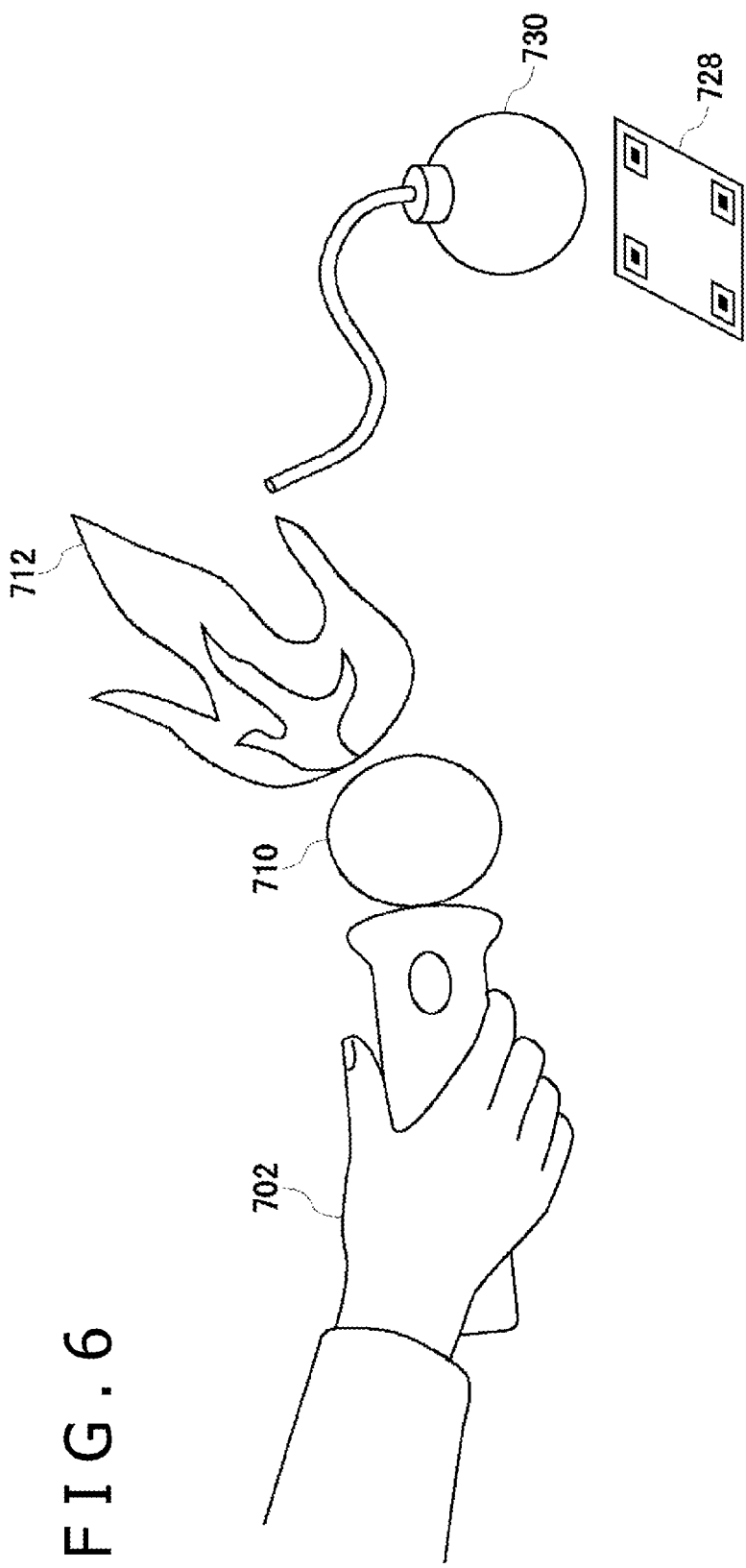
FIG. 6 is a diagram that exemplifies an interaction between two different AR images according to the embodiment.

FIG. 6 is a diagram that exemplifies an interaction between two different AR images and is a diagram showing one example of video presented to a user who wears the stereoscopic video observation device 200. In the example shown in FIG. 6, the AR image 712, which is associated with the marker 710 and represents a flame, is close to a fuse of an AR image 730 that is associated with a marker 728 of paper and represents a bomb. Although the fuse of the AR image 730 is not ignited in the example shown in FIG. 6, suppose that the proximity acquirer 560 determines that the AR image 712 has gotten sufficiently close to the fuse of the AR image 730 through moving of the marker 710 by the user. In this case, the interaction producer 570 regards the fuse of the AR image 730 as ignited and the attribute managing section 540 changes the attribute of the AR image 730 from "be not burning" to "be burning." As a result, the AR image generator 526 changes the AR image 730 in such a manner that the fuse of the AR image 730 is fired to be shortened over time.

Suppose that the bomb main body catches fire after the elapse of a predetermined time in the example shown in FIG. 6. At this time, by the AR image generator 526, the AR image 730 representing the bomb is so generated as to be split into several fragments due to an explosion. In this manner, the AR image generator 526 newly generates another AR image from one AR image in some cases. As another example of the case of newly generating another AR image from one AR image, a case in which an image of shooting a bullet is generated from an AR image representing a pistol is cited. Alternatively, suppose that the user moves the marker 710 at high speed in the example shown in FIG. 6. At this time, the movement vector and acceleration vector of the AR image 712 change according to the movement of the marker 710. If the amount of change in these physical properties per unit time surpasses a predetermined threshold, the AR image generator 526 may generate a new AR image different from the AR image 712. This allows such a production that the flame is split to fly out according to the operation by the user.

Here, in the case of newly generating another AR image from one AR image, the newly generated AR image may be associated with the marker serving as the basis or may be another marker using position information.

Figure 7:
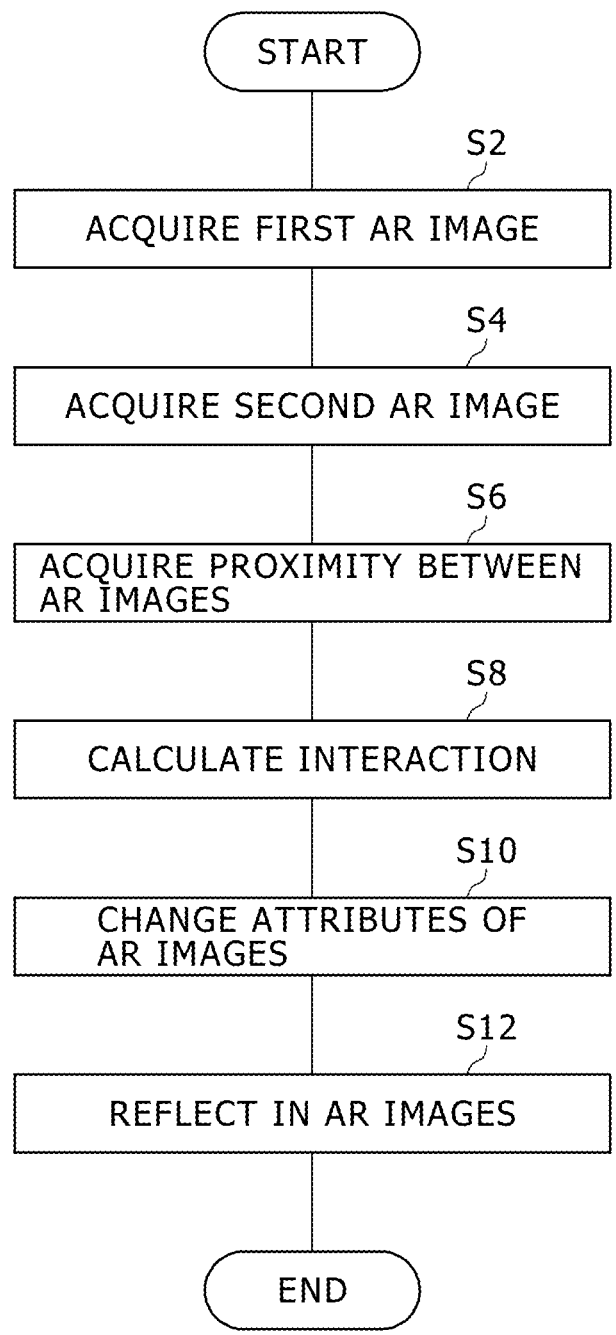
FIG. 7 is a flowchart showing the flow of interaction production processing by a video processing device according to the embodiment.

FIG. 7 is a flowchart showing the flow of interaction production processing by the video processing device 500 according to the embodiment. The processing in the present flowchart is started when the video processing device 500 is powered on for example.

The proximity acquirer 560 acquires the position coordinates, distance measurement reference point, and collision criterion radius of a first AR image associated with a first marker identified by the marker identifier 550 (S2). The proximity acquirer 560 further acquires also the position coordinates, distance measurement reference point, and collision criterion radius of a second AR image associated with a second marker identified by the marker identifier 550 (S4).

Subsequently, the proximity acquirer 560 acquires the proximity between the first AR image and the second AR image in accordance with the above-described expression (1) (S6). The interaction producer 570 calculates an interaction between the first AR image and the second AR image based on the proximity acquired by the proximity acquirer 560 (S8).

The attribute managing section 540 changes the attributes of the first AR image and the second AR image based on the interaction calculated by the interaction producer 570 (S10). The AR image generator 526 reflects the attribute changes made by the attribute managing section 540 in the first AR image and the second AR image (S12). After the AR image generator 526 reflects the attribute changes in the images, the processing in the present flowchart ends.

A use scene of the video presenting system 100 based on the above configuration is as follows. A user who wears the stereoscopic video observation device 200 and uses the video presenting system 100 moves a marker to move an AR image associated with the marker and bring it close to another AR image. The AR image generator 526 reflects an interaction by the interaction producer 570 in the AR images. This can reflect a change in the AR images and the contents of content reproduced by the content executing section 510 according to the proximity of the AR images corresponding to different markers, such as contact or collision, and the attributes of the AR images, such as velocity and acceleration, at the time. For example, by considering the acceleration of a marker, e.g. an expression of bending of an AR image of a whip associated with the marker according to the motion of the marker is enabled. Furthermore, production of special visual effects given to the AR image is also enabled.

As described above, according to the video presenting system 100 in accordance with the embodiment, a technique for producing an interaction between images generated in association with specific objects can be provided. Specifically, an application in which plural AR images mutually affect and reflection of the motion of a marker in an AR image are enabled.

The present invention is described above based on the embodiment. It will be understood by those skilled in the art that the embodiment is an exemplification and various modification examples are possible in combinations of the respective constituent elements and the respective processing processes thereof and such modification examples are also within the scope of the present invention.

First Modification Example

In the above description, explanation is made about the case in which the centroid of polygons forming an object is employed as the distance measurement reference point of the object. However, the distance measurement reference point is not limited to the coordinates of the centroid of polygons. For example, the position coordinates of one polygon among polygons forming an object may be used as the representative. In this case, the polygon used as the representative may be adaptively changed depending on the positional relationship between objects. Specifically, the position coordinates of the polygon having the shortest distance from another object among plural polygons forming an object may be employed as the coordinates of the object. This makes it possible to perform e.g. calculation for determination of collision between objects easily and accurately without using the above-described expression (1).

Second Modification Example

In the above description, explanation is made about the case in which the video presenting system 100 includes the three-dimensional monitor 300. However, it will be understood by those skilled in the art that the three-dimensional monitor 300 is not essential in the embodiment of the present invention and the embodiment of the present invention holds even when the output destination of stereoscopic video is only the optically transmissive HMD in the stereoscopic video observation device 200.

Third Modification Example

Although the interaction when AR images are in contact with each other is mainly explained in the above description, the interaction is calculated even when AR images are not in contact with each other. For example, when a user moves a marker to wave an AR image representing a paper fan toward an AR image representing a piece of paper, an interaction of blowing off the AR image representing the piece of paper is produced when the AR image representing the paper fan and the AR image representing the piece of paper get sufficiently close to each other without the contact of both. In this manner, the interaction is determined depending on the proximity between AR images.

Fourth Modification Example

In the above description, explanation is made about the case in which the proximity acquirer 560 acquires the proximity between two different AR images. However, the proximity calculated by the proximity acquirer 560 is not limited to the proximity between two different AR images and the proximity between a certain AR image and a marker may be obtained. This case will be described below.

FIG. 8 is a diagram explaining the proximity between a certain AR image and a marker. In the example shown in FIG. 8, a user handles the marker 710 and attempts to strike a character 302 displayed in the display area of the three-dimensional monitor 300 with an AR image 732 associated with the marker 710. The example shown in FIG. 8 is an example of a game application and it is assumed that the user attacks the character 302 as an enemy character by striking it with the AR image 732 representing thunder.

As described above, the display area of the three-dimensional monitor 300 is also one marker. The proximity acquirer 560 acquires the proximity between the AR image 732 and the character 302, which is partial video displayed in the display area of the three-dimensional monitor 300 as a marker. That is, the proximity acquirer 560 calculates the proximity between an AR image and a marker. Due to this, for example even when content reproduced by the content executing section 510 is two-dimensional content of a conventional type and video displayed in the display area of the three-dimensional monitor 300 is two-dimensional video of a conventional type, an interaction with a three-dimensional AR image can be produced.

REFERENCE SIGNS LIST

100 Video presenting system, 200 Stereoscopic video observation device, 202 Presenting section, 204 Imaging element, 206 Casing, 300 Three-dimensional monitor, 302 Character, 400 Information processing device, 500 Video processing device, 502 Object acquirer, 510 Content executing section, 520 Video generator, 522 Control section, 524 Object generator, 526 AR image generator, 530 Output section, 540 Attribute managing section, 550 Marker identifier, 560 Proximity acquirer, 570 Interaction producer, 602 Orthogonal coordinate system, 704 Coordinate system

INDUSTRIAL APPLICABILITY

The present invention can be utilized for a video processing device, a video processing method, and a video processing system.

The invention claimed is:

1. A video processing device comprising:
an AR image generator that employs, as a marker, a subject imaged by an imaging element provided for an optically transmissive HMD and generates an AR (Augmented Reality) image to be presented by the optically transmissive HMD, the optically transmissive HMD presenting video observed when a three-dimensional image in a virtual three-dimensional space is projected into a real space, the imaging element imaging the subject existing in a region including a field of view of a user who wears the optically transmissive HMD;
a proximity acquirer that acquires proximity in the virtual three-dimensional space between a first AR image associated with a first marker and a second marker or a second AR image associated with the second marker,
wherein the proximity is calculated by comparing a sphere having a first radius centered at the first marker with a sphere having a second radius centered at the second marker to determine if the first sphere and the second sphere intersect; and
an interaction producer that calculates an interaction caused with the first AR image or the second AR image based on the intersection determined by the proximity acquirer;
the AR image generator changing at least either one image of the first AR image or the second AR image according to the interaction calculated by the interaction producer,
wherein the first AR image is composed of a plurality of polygons, and
wherein a position coordinate of the first marker is adaptively set at a coordinate of a polygon of the plurality of polygons having a shortest distance to the second marker.

2. The video processing device according to claim 1, further comprising
an attribute managing section that manages an attribute including a virtual physical property given to each of AR images generated by the AR image generator;
the AR image generator changing an image to be generated when the attribute changes.

3. The video processing device according to claim 2, wherein the attribute managing section changes the attribute given to the first AR image or the second AR image according to the interaction calculated by the interaction producer.

4. The video processing device according to claim 2, wherein
the physical property included in the attribute managed by the attribute managing section includes at least one of position coordinates, velocity, acceleration, or mass of the AR image in the virtual three-dimensional space, and
the interaction producer changes the physical property of the first AR image and the physical property of the second AR image based on the intersection determined by the proximity acquirer.

5. The video processing device according to claim 2, wherein the attribute managed by the attribute managing section includes information indicating a visual effect to be reflected in the AR image.

6. A video processing method comprising:
generating an AR image that is to be presented by a stereoscopic video observation device including an optically transmissive HMD and an imaging element and employs a subject imaged by the imaging element as a marker, the optically transmissive HMD presenting video observed when a three-dimensional image in a virtual three-dimensional space is projected into a real space, the imaging element imaging the subject existing in a region including a field of view of a user who wears the optically transmissive HMD;
acquiring proximity in the virtual three-dimensional space between a first AR image associated with a first marker and a second marker or a second AR image associated with the second marker,
wherein the proximity is calculated by comparing a sphere having a first radius centered at the first marker with a sphere having a second radius centered at the second marker to determine if the first sphere and the second sphere intersect;
calculating an interaction caused with the first AR image or the second AR image based on the determined intersection; and
changing at least either one image of the first AR image or the second AR image according to the calculated interaction,
wherein the first AR image is composed of a plurality of polygons, and
wherein a position coordinate of the first marker is adaptively set at a coordinate of a polygon of the plurality of polygons having a shortest distance to the second marker.

7. A non-transitory computer-readable medium having executable programming instructions stored thereon, the program comprising:
generating an AR image that is to be presented by a stereoscopic video observation device including an optically transmissive HMD and an imaging element and employs a subject imaged by the imaging element as a marker, the optically transmissive HMD presenting video observed when a three-dimensional image in a virtual three-dimensional space is projected into a real space, the imaging element imaging the subject existing in a region including a field of view of a user who wears the optically transmissive HMD;
acquiring proximity in the virtual three-dimensional space between a first AR image associated with a first marker and a second marker or a second AR image associated with the second marker,
wherein the proximity is calculated by comparing a sphere having a first radius centered at the first marker with a sphere having a second radius centered at the second marker to determine if the first sphere and the second sphere intersect;
calculating an interaction caused with the first AR image or the second AR image based on the determined intersection; and
changing at least either one image of the first AR image or the second AR image according to the calculated interaction,
wherein the first AR image is composed of a plurality of polygons, and
wherein a position coordinate of the first marker is adaptively set at a coordinate of a polygon of the plurality of polygons having a shortest distance to the second marker.

8. A video processing system comprising:
an optically transmissive HMD that presents video observed when a three-dimensional image in a virtual three-dimensional space is projected into a real space;
an imaging element that is provided for the optically transmissive HMD and images a subject existing in a region including a field of view of a user who wears the optically transmissive HMD;

an AR image generator that employs the subject imaged by the imaging element as a marker and generates an AR (Augmented Reality) image to be presented by the optically transmissive HMD;

a proximity acquirer that acquires proximity in the virtual three-dimensional space between a first AR image associated with a first marker and a second marker or a second AR image associated with the second marker, wherein the proximity is calculated by comparing a sphere having a first radius centered at the first marker with a sphere having a second radius centered at the second marker to determine if the first sphere and the second sphere intersect; and an interaction producer that calculates an interaction caused with the first AR image or the second AR image based on the determined intersection by the proximity acquirer;

the AR image generator changing at least either one image of the first AR image or the second AR image according to the interaction calculated by the interaction producer, wherein the first AR image is composed of a plurality of polygons, and wherein a position coordinate of the first marker is adaptively set at a coordinate of a polygon of the plurality of polygons having a shortest distance to the second marker.

9. The video processing device according to claim 1, wherein the first radius is directly proportional to a size of the first AR image and the second radius is directly proportional to a size of the second AR image.

10. The video processing device according to claim 1, wherein the first radius is a distance measured from the first marker to a farthest point on the first AR image.

11. The video processing device according to claim 1, the first radius is set as an average of distances from the first marker to each of the plurality of polygons of the first AR image.

12. The video processing device according to claim 1, the first radius is set as a minimum of distances from the first marker to each of the plurality of polygons of the first AR image.

* * * * *